United States Patent [19]

Anderson et al.

[11] 4,089,494
[45] May 16, 1978

[54] REDUCED SERVO NOISE CONTROL FOR A HYDRAULIC ACTUATOR

[75] Inventors: Alvin M. Anderson, Long Beach; William Comley, Rancho Palos Verdes; Douglas B. Engum, Huntington Beach, all of Calif.

[73] Assignee: McDonnell Douglas Corporation, Long Beach, Calif.

[21] Appl. No.: 751,532

[22] Filed: Dec. 16, 1976

[51] Int. Cl.² ............................................ G05D 1/10
[52] U.S. Cl. .................................... 244/178; 91/361; 91/363 R; 244/83 G; 244/85; 318/628
[58] Field of Search ............... 244/83 D, 83 F, 83 G, 244/83 H, 83 R, 75, 76 C, 78, 85, 178, 191, 194, 177; 35/12 R, 12 P, 10.2; 318/628; 91/358 R, 359, 365, 390, 361, 362, 363 R, 363 A

[56] References Cited

U.S. PATENT DOCUMENTS

| | | | |
|---|---|---|---|
| 3,120,787 | 2/1964 | Schmitt | 244/85 |
| 3,552,271 | 1/1971 | Suggs | 91/361 |
| 3,752,189 | 8/1973 | Marr | 91/363 R |

*Primary Examiner*—Trygve M. Blix
*Assistant Examiner*—Reinhard J. Eisenzopf
*Attorney, Agent, or Firm*—Walter J. Jason; Donald L. Royer

[57] ABSTRACT

In a hydraulic actuator such as those used in multiple degree freedom motion bases for aircraft simulators, a secondary force sensitive hydraulic servo loop is added in parallel to the primary position feedback servo loop with the secondary loop having a servo valve possessing substantially greater band pass and less capacity than the main valve used in the first servo loop. Force feedback from the control actuator is applied degeneratively to the smaller servo valve, thereby reducing noise and jitter caused by responses of the system outside the response of the primary servo loop. The response of the main servo loop which control the position of the actuator is low pass and restricts response to the full desired band pass of operational frequencies. The secondary loop is high pass and is shaped to prevent degeneration of operational frequencies while providing optimum gain and phase for the degeneration of the unwanted high frequency portion of the band wherein noise and jitter reside.

8 Claims, 2 Drawing Figures

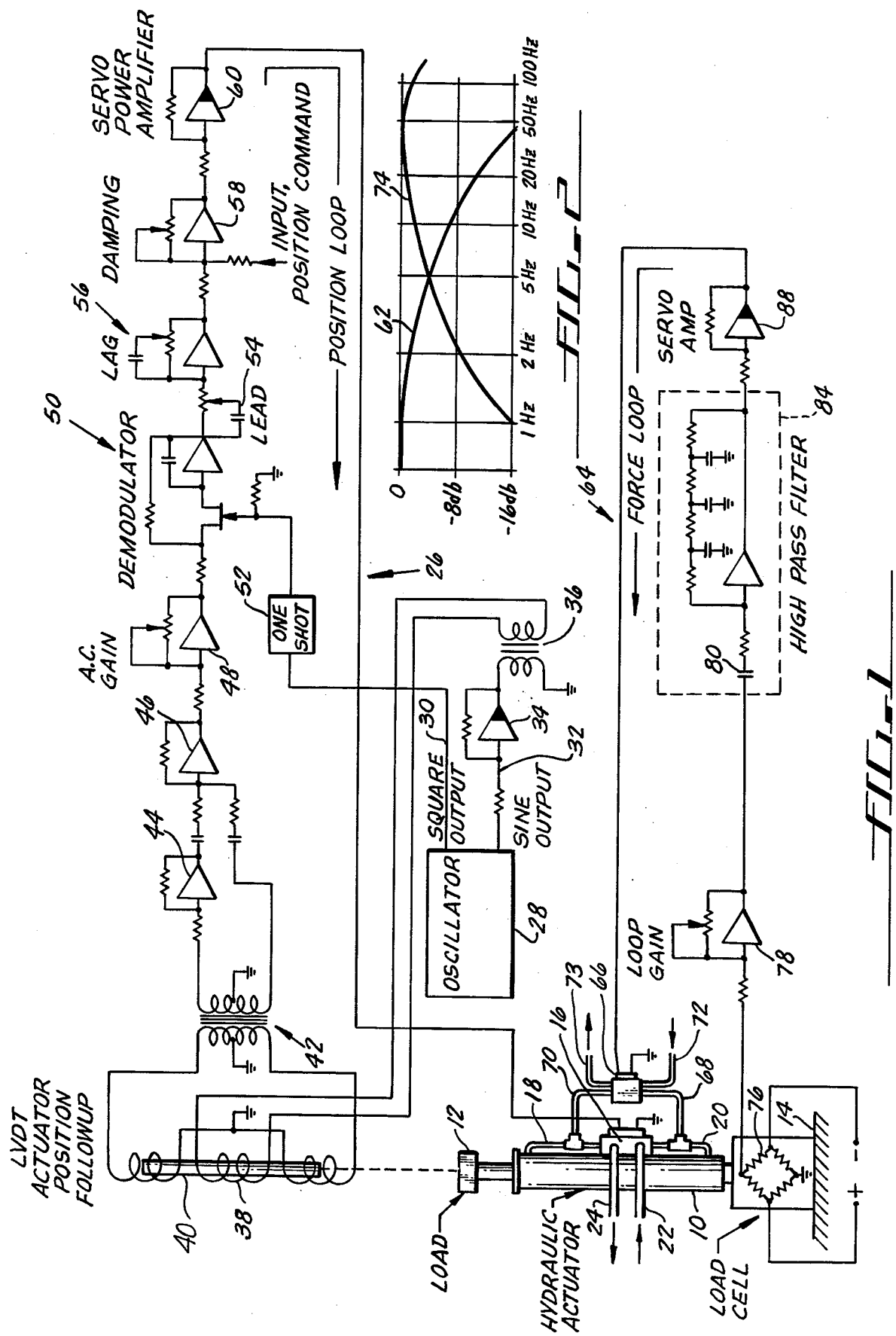

REDUCED SERVO NOISE CONTROL FOR A HYDRAULIC ACTUATOR

CROSS REFERENCE TO RELATED PATENTS

This patent relates to the subject matter of U.S. Pat. No. 3,529,354 entitled, "Control System For Platform Having Six Degrees of Freedom" by D. D. Roberts, et al and U.S. Pat. No. 3,743,952 entitled, "Phase Sensitive Demodulator" by W. Comley, Jr., et al and reference is made thereto as though fully set forth herein below.

BACKGROUND OF THE INVENTION

Flight training equipment frequently includes the simulated cockpit of an aircraft. It is customary to mount the simulated cockpit on the platform of a motion base to enable the simulated cockpit to assume attitudes which at least partially simulate the various attitudes and accelerations which the cockpit of the corresponding aircraft can assume in actual flight. A number of motion bases of different capacity and concept are commercially available. A typical example is the motion base shown in U.S. Pat. No. 3,529,354. Since the complexity and hence the size of such simulated cockpits tend to be relatively large, most of the successful motion bases have in common a plurality of powerful hydraulic actuators that must be large enough to supply accelerations to the simulated cockpit sufficient to simulate the actual response of a cockpit in a flying airplane.

The heretofore known motion systems and hydraulic actuators generally have been subject to the problem of noise and jitter of a magnitude that renders them marginally acceptable for man rated simulation motion systems. Even when reduced to a minimum these effects are very distractive to simulator pilots. The basic problem is related generally to limit cycling due to static and coulomb frictions, and hydraulic oil column resonance.

The degree to which such effects can be reduced is limited by the pass band of the servo valve of the actuator, and its ability to provide degeneration of the noise frequencies at the proper phases. The response of servo valves which are large enough to provide the necessary flow to the large hydraulic actuators involved to not possess an adequate pass band to allow proper degeneration of the noise and jitter. Therefore, it has become a common practice among users of such systems to reduce overall servo gain thereby compromising the performance to reduce distracting vibrations within the simulator.

BRIEF SUMMARY OF THE INVENTION

The problems heretofore mentioned in the control of motion base actuators and other high performance large flow actuators have been solved through the use of the present invention wherein the basic hydraulic actuator position feedback servo loop is augmented by adding a second force feedback servo loop in parallel thereto. The second loop may utilize a servo valve of substantially less capacity than the primary servo valve. Therefore, the small servo valve can be constructed to possess a substantially higher frequency pass band than the primary valve used in the basic position loop. The second loop is constructed to be totally independent of the first with force feedback derived from an axial sensor on the actuator being fed back degeneratively, the small servo valve thereby being able to reduce the noise and jitter which is within the pass band of the secondary loop. In addition, special attention is given to shaping the response of both servo amplifiers. The response of the main position loop is low pass and restricts response to the full desired pass band of operational frequencies. The secondary force loop, on the other hand, is constructed to be a high pass system and the response is shaped to prevent degeneration of operational frequencies while providing optimum gain and proper phase for the degeneration of the unwanted portion of the band wherein noise and jitter reside.

It is, therefore, an object of the present invention to provide a control for a high capacity hydraulic actuator which reduces unwanted noise and jitter therein without adversely affecting the operational response thereof.

Another object is to improve the performance of state-of-the-art aircraft simulators which have a cockpit mounted on a motion base.

Another object is to improve hydraulic actuator response without undue expense or complexity.

Another object is to provide an improved hydraulic actuator control device which can be used in such diverse fields as airplane simulators, hydraulic servo operated machine tools, medical prosthetic devices and servo controlled plotters.

These and other objects and advantages of the present invention will be apparent to those skilled in the art after considering the following detailed specification which discloses a preferred embodiment thereof in conjunction with the accompanying drawing:

BRIEF DESCRIPTION OF THE DRAWING

FIG. 1 is a diagramatic representation showing the preferred embodiment of the present invention in combination with a hydraulic actuator of the type commonly used in motion base simulators; and FIG. 2 is a graph showing the frequency response of the two servo loops.

DETAILED DESCRIPTION OF THE PREFERRED EMBODIMENT

Referring to the drawing, particularly by reference numbers, number 10 in FIG. 1 refers to a hydraulic actuator which is used to move a load 12 with respect to a base shown as ground plane 14. Actuators such as actuator 10 are commonly used to move the simulated cockpits in aircraft simulators with multiple actuators 10 being employed to impart the desired motion to the cockpit or load 12. The output position of the hydraulic actuator 10 is controlled by means of an electro-hydraulic servo valve 16 which is hydraulically connected to the actuator 10 by means of feed pipes 18 and 20. A source of pressurized hydraulic fluid (not shown) is connected to the valve 16 by means of inlet pipe 22 and outlet pipe 24. The servo valve 16 receives its electrical control commands from suitable control circuitry 26, such as that shown in U.S. Pat. No. 3,743,952.

Briefly the circuitry 26 includes an oscillator 28 which produces square wave and sine wave outputs on lines 30 and 32 respectively which are 90° out of phase. The sine wave output is amplified and transformed by means of amplifier 34 and transformer 36. The sine wave output of the transformer 36 is fed to an inductive position sensor 38, a movable portion 40 of which being connected to the load 12 so that relative motion between the load 12 and the ground plane 14 can be sensed. The output of the sensor 38 is a sine wave whose amplitude and sign with respect to the sine wave output of oscillator 28 depends upon the position of the load 12 with respect to the ground plane 14. This sine wave sensor output signal is passed through a transformer 42 and through the amplifiers 44, 46 and 48 to a track and store demodulator 50 where it is sampled at a time determined by condition of the square wave signal on line 30 which is used to trigger a one shot circuit 52 at the proper time to store the peak of the signal in the demodulator 50. The output of the demodulator 50 is a DC signal which is passed through suitable compensating circuitry including a lead circuit 54, a lag circuit 56 and a damping circuit 58. In the damping circuit 58 the signal is compared with the input position command signal from the simulator and the error signal so created is then amplified by a servo power amplifier 60 and fed to the electrical input of the servo valve 16 which by causing the hydraulic actuator to move the load 12 to the commanded position closes the position loop.

The frequency response of such a prior art position servo loop is determined primarily by the capacity of the valve 16. As such valves are constructed with large capacities to enable the desired motion output of the hydraulic actuator 10, their frequency response necessarily is reduced with a typical response being shown as curve 62 in FIG. 2. Heretofore the discussion has briefly explained the typical hydraulic actuator and control system therefore commonly used in aircraft simulators.

By reference to FIG. 2 it should be noted that the frequency response of the primary position loop falls off sharply at 1 Hz, yet frequencies from 1 Hz to 20 Hz when present in a motion base simulator are very distracting to a pilot and therefore means have been required to control and eliminate these undesirable and heretofore unavoidable vibrations in the hydraulic actuator system.

This is accomplished through the use of a secondary force sensitive loop 64 which includes a second electro hydraulic servo valve 66 whose control outputs 68 and 70 are tied into lines 18 and 20 feeding the hydraulic actuator 10. Source and drain supply lines 72 and 73 are also shown for connecting the valve 56 to a suitable source of hydraulic energy. The flow capacity of the valve 66 is chosen to be substantially less than that of valve 16 with the curves of FIG. 2 being shown for a valve 66 having about 1/20th of the capacity of valve 16 since small capacity electro hydraulic servo valves such as valve 66 naturally have higher frequency responses. This can be observed by reference to FIG. 2 wherein curve 74 represents the frequency characteristic of the force loop 64 and the higher frequency cut off of curve 74 is primarily determined by the capacity characteristics of the valve 66. However, the portion of the curve 74 below 20 Hz is primarily determined by the electrical control circuitry in the force loop 64.

The force loop 64 includes a force sensor connected between the ground plane 14 and the load 12 to sense the amount of force being generated by the hydraulic actuator 10. The force sensor shown is a bridge type load cell 76 whose voltage output is proportional to the instantaneous force along the axis of the actuator 10. This signal is amplified by means of an adjustable loop gain amplifier 78 and the varying portion of the output signal thereof is passed through capacitor 80 to eliminate any undesired direct current component. The signal is then passed through a high frequency pass filter 84 of conventional design, which removes any low frequency components thereof. The effect of the high pass filter 84 can be seen by looking at the portion of curve 74 in FIG. 2 which is below 20 Hz. The high pass filter 84 provides the desired low frequency fall-off for curve 74. The output of the high pass filter 84 is amplified in the servo amplifier 88 and is fed to the electrical input of the electro hydraulic valve 66 which applies the relatively high frequency hydraulic inputs to the hydraulic actuator to counteract those sensed at the load cell 76. The closure of the secondary force loop 64 results in the degeneration of spurious motion due to the irreducible mechanical imperfections inherent in such a hydraulic actuator system.

Thus, there has been shown and described novel control means for reducing the noise in hydraulic actuators which fulfill all the objects and advantages sought therefore. Many changes, modifications, variations and other uses and applications of the subject invention will, however, become apparent to those skilled in the art after considering this specification and the accompanying drawing. All such changes, modifications, variations and other uses and applications which do not depart from the spirit and scope of the invention are deemed to be covered by the invention which is limited only by the claims which follow:

What is claimed is:

1. An electrically controlled hydraulic actuator system having a position sensor and a first controlled servo valve hydraulically connected to move the hydraulic actuator to commanded positions, said first controlled servo valve having a position loop connected thereto and to the position sensor, the frequency response of the position loop so formed being below a predetermined value, the improvement comprising:
    a second controlled servo valve hydraulically connected to said hydraulic actuator;
    a force sensor connected to said hydraulic actuator, said sensor generating electrical signals which correspond to the forces generated by said hydraulic actuator; and
    a high pass filter which feeds predetermined high frequency components of said sensor signals to said second controlled servo valve which applies hydraulic energy degeneratively to said actuator whereby said improvement reduces undesired high frequency vibrations of said system.

2. The system defined in claim 1 wherein the hydraulic capacity of said first controlled servo valve is larger than the hydraulic capacity of said second controlled servo valve.

3. The system defined in claim 2 wherein the hydraulic capacity of said first controlled servo valve is substantially larger than the hydraulic capacity of said second controlled servo valve.

4. The system defined in claim 1 wherein the frequency response of said position loop has an upper frequency cut off below the upper frequency cut off of the force loop consisting of said second controlled servo valve, force sensor and high pass filter.

5. The system defined in claim 1 wherein the hydraulic output of said second controlled servo valve is combined with the output of said first controlled servo valve.

6. The system defined in claim 5 wherein said first and second controlled servo valve each have a predetermined control authority, the control authority of said second controlled servo valve being substantially less than the control authority of said first controlled servo valve.

7. The system defined in claim 6 wherein said high pass filter includes an input capacitor in series with said force sensor to eliminate any constant bias in said force sensor.

8. The system defined in claim 7 including a ground wherein said hydraulic actuator is operatively connected for force opposition to said ground and said force sensor is a bridge type load cell mounted between said hydraulic actuator and the ground.

* * * * *